No. 646,642. Patented Apr. 3, 1900.
E. S. FRAZIER.
SHAFT FOR SULKIES.
(Application filed Mar. 31, 1898.)
(No Model.)

Witnesses

Inventor
Edward S. Frazier,
by Bond Adams Pickard Jackson
Atty's

THE NORRIS PETERS CO., PHOTO-LITHO., WASHINGTON, D. C.

UNITED STATES PATENT OFFICE.

EDWARD S. FRAZIER, OF AURORA, ILLINOIS.

SHAFT FOR SULKIES.

SPECIFICATION forming part of Letters Patent No. 646,642, dated April 3, 1900.

Application filed March 31, 1898. Serial No. 676,025. (No model.)

*To all whom it may concern:*

Be it known that I, EDWARD S. FRAZIER, a citizen of the United States, residing at Aurora, in the county of Kane and State of Illinois, have invented a certain new and useful Improvement in Shafts for Sulkies, of which the following is a specification, reference being had to the accompanying drawings.

My invention relates to shafts for sulkies and other similar two-wheeled vehicles. In shafts of this character, in which it is essential to combine the maximum strength with the minimum weight, it is desirable that the center of the shaft be much stronger than the ends, as in hitching a horse to a sulky the points of the shaft are strained inwardly by the girthing of the harness, so that the sulky will properly follow the horse, and the strain thus applied to the shafts near the ends is resisted at the center of the shafts, and unless they are stronger at that point they are liable to break where wooden shafts are used, or with metal shafts they are liable to kink and bend. I have discovered, however, that the objection above pointed out may be avoided by making the intermediate portion of the shaft of metal tubing and providing lighter end portions which extend from the intermediate portion, such end portions being either of wood or metal, as hereinafter described, whereby the desired strength and stiffness of the shaft as a whole are obtained, while at the same time the desired lightness in weight is secured.

What I regard as new will be set forth in the claims.

Figure 1:
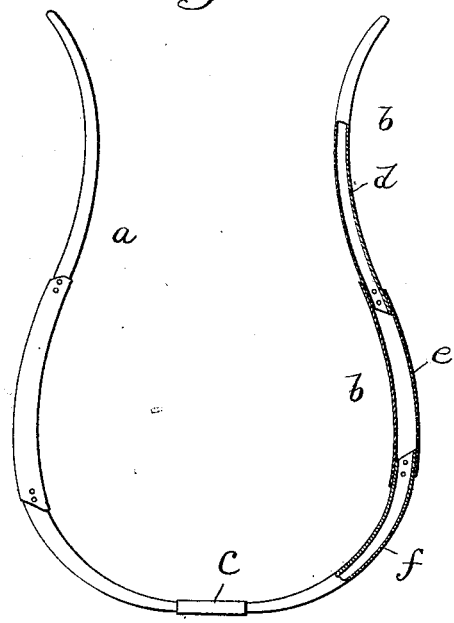
Figure 2:
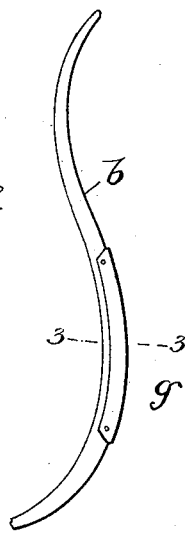
Figure 3:

Referring to the accompanying drawings, Figure 1 is a view, partly in section, illustrating one form of my invention. Fig. 2 is a view showing another form. Fig. 3 is a cross-section on line 3 3 of Fig. 2, and Fig. 4 is a view showing a third form of my invention.

As illustrated in Fig. 1, the pair of shafts is composed of two members *a b*, joined at the rear by a ferrule *c*. In the form of my invention shown in Fig. 1 each member of the shaft is composed of three sections—a forward section *d*, a middle section *e*, and a rear section *f*. The forward and rear sections *d* and *f* are lighter and smaller in diameter than the intermediate section *e* and project into it slightly, being secured thereto by rivets or other suitable means, as shown in Fig. 1. The intermediate section *e* is of greater diameter than the end sections and is of heavier tubing—that is to say, tubing of greater weight per foot. By this construction the requisite strength of the intermediate portion of the shafts is preserved, together with its capacity to resist the strain to which it is subjected, while the end portions, which do not receive any considerable amount of strain, may be as light as desired.

Figure 4:
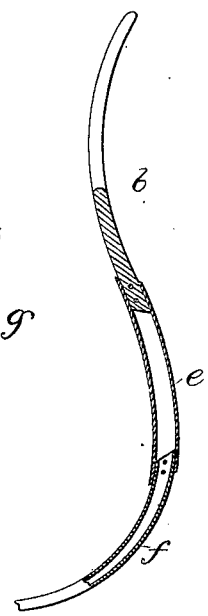

Instead of making the end portions of the shafts of metal they may be made of wood and secured to the intermediate portion in the same way as shown in Fig. 4.

In the form of my invention shown in Fig. 2 instead of making the shaft members each of three separate pieces each shaft is made of a single piece of tubing tapered toward its ends, and the intermediate portion is reinforced by a reinforcing-strip *g*, which fits upon the shaft and is about one-third the length thereof. The reinforcing-strip is secured to the shaft by rivets or in any other suitable way. The effect of securing the reinforcing-piece *g* to the tubing is the same as making such intermediate portion heavier. In the drawings I have shown the reinforcing-strip *g* as applied only to the form of shaft illustrated in Fig. 2; but it will be obvious that this reinforcing-strip may be applied to all the forms without departing from the spirit of my invention.

That which I claim as my invention, and desire to secure by Letters Patent, is—

1. A pair of shafts for two-wheeled vehicles consisting of two members curved at their rear ends into line with each other and there connected together, each of said members consisting of a tubular intermediate portion, and end portions extending forward therefrom said intermediate portions being of greater diameter than the end portions, substantially as described.

2. A pair of shafts for two-wheeled vehicles consisting of two tubular members having their rear ends curved inward toward and into line with each other, and a sleeved connecting device connecting said inwardly-curved ends, substantially as described.

3. A pair of shafts for two-wheeled vehicles consisting of two members connected at their rear ends, each of said members having a tubular intermediate portion, and a wooden end portion secured to said intermediate portion at the front end thereof and extending forward therefrom, substantially as described.

4. A pair of shafts for two-wheeled vehicles, consisting of two members connected at their rear ends by a ferrule, each of said members consisting of a tubular intermediate portion, and end portions extending from said intermediate portion, substantially as described.

5. A pair of shafts for vehicles, consisting of two members curved at their rear ends into line with each other and there connected together, each of said members consisting of a tubular intermediate portion, and end portions extending forward therefrom, said intermediate portions being reinforced and of greater diameter than the end portions, substantially as described.

EDWARD S. FRAZIER.

Witnesses:
LEROY M. LANE,
A. R. EVANS.